United States Patent
Snyder, II et al.

(10) Patent No.: US 11,509,750 B2
(45) Date of Patent: Nov. 22, 2022

(54) NETWORK SWITCHING WITH CO-RESIDENT DATA-PLANE AND NETWORK INTERFACE CONTROLLERS

(71) Applicant: Cavium, Inc., San Jose, CA (US)

(72) Inventors: Wilson Parkhurst Snyder, II, Holliston, MA (US); Muhammad Raghib Hussain, Saratoga, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/132,424

(22) Filed: Sep. 16, 2018

(65) Prior Publication Data

US 2019/0028576 A1 Jan. 24, 2019

Related U.S. Application Data

(62) Division of application No. 14/542,485, filed on Nov. 14, 2014, now Pat. No. 10,116,772.

(51) Int. Cl.
*H04L 69/22* (2022.01)
(52) U.S. Cl.
CPC .................... *H04L 69/22* (2013.01)
(58) Field of Classification Search
CPC ................ H04L 47/10; H04L 69/22
See application file for complete search history.

(56) References Cited

U.S. PATENT DOCUMENTS

| | | | | |
|---|---|---|---|---|
| 5,809,026 A * | 9/1998 | Wong | ..................... | H04L 49/351 370/239 |
| 7,620,046 B2 * | 11/2009 | Ronciak | ................. | H04L 47/125 370/392 |
| 7,620,057 B1 * | 11/2009 | Aloni | .................. | G06F 12/0804 370/395.7 |
| 8,036,123 B1 * | 10/2011 | Cohen | .................. | H04J 3/0682 370/230 |
| 8,429,675 B1 * | 4/2013 | Radhakrishnan | ... | G06F 9/45558 719/319 |
| 2006/0067228 A1 * | 3/2006 | Ronciak | .................. | H04L 47/10 370/235 |
| 2007/0253430 A1 * | 11/2007 | Minami | .............. | H04L 12/2898 370/395.52 |
| 2009/0304002 A1 * | 12/2009 | Yu | ........................... | H04L 49/30 370/395.3 |
| 2010/0067539 A1 * | 3/2010 | Lin | ......................... | H04L 49/90 370/419 |
| 2013/0298183 A1 * | 11/2013 | McGrath | ................. | G06F 16/13 718/1 |
| 2013/0343181 A1 * | 12/2013 | Stroud | .................... | H04L 69/22 370/229 |
| 2016/0182692 A1 * | 6/2016 | Snyder, II | ............... | H04L 69/22 370/392 |

* cited by examiner

*Primary Examiner* — Yee F Lam
(74) *Attorney, Agent, or Firm* — Pkalousek.ip

(57) ABSTRACT

A system with co-resident data-plane and network interface controllers embodying a method for network switching of a data packet incoming from a network at a packet input processor portion of a network interface resource comprising the packet input processor, a packet output processor, and a network interface controller, implemented on a chip, to a target entity, is disclosed. Additionally, the system embodying a method for network switching of a data packet outgoing from an internal facing interface of a network interface controller portion of the network interface resource to a network is disclosed.

17 Claims, 6 Drawing Sheets

NETWORK SWITCHING WITH CO-RESIDENT DATA-PLANE AND NETWORK INTERFACE CONTROLLERS

BACKGROUND

1. Field

The present disclosure relates to communications in computer networks. More particularly, this invention is directed toward network switching with co-resident data-plane and network interface controllers.

2. Description of Related Technology

In modern communications networks, information (voice, video, data) is transferred among the nodes of the communications network in the form of packet data. A packet is a formatted unit of data carried by a packet-switched network. A packet consists of two kinds of data: control information and user data (also known as payload). The control information provides data the network needs to deliver the user data, for example: source and destination network addresses, error detection codes, and sequencing information. Typically, control information is found in packet headers and trailers, with payload data in between.

In traditional computer systems, a computer is connected to a communication network via a network interface controller (NIC). The NIC comprises a network facing physical port to connect to the communication network, an electronic circuitry required to communicate using a specific physical layer and data link layer standards and an internal facing physical interface allowing a driver to interface the NIC with the computer. The electronic circuitry may comprise an application-specific integrated circuit (ASIC). An ASIC comprises an integrated circuit (IC) customized for a particular use, rather than intended for general-purpose use.

The packet processing at the NIC is interrupt driven. Interrupt is a signal to the processor emitted by hardware or software, indicating an event that needs immediate attention. Consider, by means of an example, an incoming packet arriving at the NIC. The NIC writes the packet into a the NIC's memory; ascertains that the packet is valid by performing verification, e.g., a Cyclic Redundancy Check (CRC), and then sends the packet to the computer's memory buffer requested by a driver from and allocated by a kernel. A the kernel is a computer program that manages input/output requests from software, and translates them into data processing instructions for the central processing unit and other electronic components of a computer. The kernel is a fundamental part of a modern computer's operating system. After the buffer has been allocated, the driver provides the address of the computer's memory buffer to the NIC. After writing the packet to the computer's memory buffer, the NIC sends an interrupt to the kernel. The kernel responds by servicing the interrupt, with all the overhead associated with the interrupt, i.e., suspending current activities, saving the current activities state, and executing an interrupt handler routine. This interruption is temporary, and, after the interrupt handler routine finishes, the processor resumes normal activities.

The interrupt handler routine carries out packet processing related to packet management, e.g., switching/routing, packet/frame discrimination, Quality of service (QoS) enforcement, access control, encryption, Transmission Control Protocol (TCP) offload processing, and other packet management known to a person skilled in the art, and delivers the packet to the destination entity.

The packet management is implemented in the kernel's software, and since the kernel software runs on a general purpose processor, the software implementation has low performance. Coupled with the interrupt overhead, the packet processing using the NIC negatively affects network performance, e.g., throughput, latency, and other network performance criteria known to a person of ordinary skill in the art.

Based on the foregoing, usage of traditional computer systems for general packet management, is inefficient. To solve at least some of the problems, network processors, which comprise software programmable hardware devices, often implemented as integrated circuits (IC) have been developed. Network processors have specific features or architectures optimizing packet processing within the communication networks. Such packet processing may comprise e.g., pattern matching, key lookup, data bit-field manipulation, queue management, control processing, and other processing known to a person of ordinary skill in the art.

Using the specific function of the network processor, the software program implements an application that the network processor executes, resulting in the piece of physical equipment performing a task or providing a service. Such applications may comprise, e.g., switching/routing, packet/frame discrimination, Quality of service (QoS) enforcement, access control, encryption, Transmission Control Protocol (TCP) offload processing, and other applications known to a person skilled in the art.

In addition, network processors use data-plane architecture that defines the processing of the packets arriving on an inbound interface to determine the path from the internal data-plane fabric to the proper outgoing interface(s). To support such architecture, the network processors employ event driven processing. An event is an action or occurrence detected by a system entity that then transfers the event to another entity that is a consumer of the event. The consumer entity eventually applies a reaction to the event. Unlike an interrupt that may demand immediate service at any time, events are normally handled synchronously, i.e., the system explicitly waits for an event to be serviced (typically by calling an instruction that dispatches the next event). Since the event is serviced after a previous event has finished, the overhead associated with interrupt processing is avoided.

Considering, by means of an example, an incoming packet arriving at the network processor inbound interface. The inbound interface writes the packet into a memory; ascertains that the packet is valid by performing verification, e.g., a Cyclic Redundancy Check (CRC) and then sends the packet to the computer's memory buffer requested by the interface and allocated by a memory manager. After the buffer has been allocated, the memory manager provides the address of the memory to the processor network inbound interface, which writes the packet to the computer's memory. After writing the packet to the computer's memory, the inbound interface generates an event. The event is provided to an event handling entity, e.g., via a scheduler, that schedules the event processing by the packet destination entity.

When the destination entity is ready to carry the processing of the packet, the entity requests an event from the event handling entity. The event handling entity then provides the event caused by the packet, and the destination entity carries out the packet processing.

Optionally, the event handling entity may carry out processing related to packet management, e.g., packet/frame discrimination, Quality of service (QoS) enforcement, access control, encryption Transmission Control Protocol (TCP) offload processing, and other packet management known to a person skilled in the art, and delivers the packet to the destination entity. Since the packet management is implemented using the specific function of the network processor, the implementation has high performance.

Current computer systems increasingly employ virtualization, i.e., a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity, i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

FIG. 1 depicts a conceptual structure of a virtualization system 100. A hardware platform 102 comprises all physical entities embodying computing resources required by a specific host machine, i.e., a central processor unit, an input/output resource, a storage system, a network resource, and other resources known to a person having ordinary skill in the art. To avoid undue complexity, only a storage system 104, a network resource 106, are shown. The storage system 104, may comprise a hard drive, a semiconductor based memory, and other types of memory known in the art. The terms storage system and memory are used interchangeably. The network resource 106 may comprise at least one NIC.

The hardware platform 102, together with an optional software entity 108, i.e., operating system, comprises a host machine operating a Type 2 hypervisor, also known as hosted hypervisor 110. As well known to a person having ordinary skill in the art, the optional software entity 108 is not necessary for Type 1 hypervisor, also known as native hypervisor. A hypervisor is software or firmware entity that creates and operates at least one virtual machine, also referred to as a guest and/or a guest machine. As depicted in FIG. 1, the hosted hypervisor 110 created and operates three virtual machines 112; however different number of virtual machines, including a single virtual machine, is contemplated. Through hardware virtualization, the hosted hypervisor 110 provides each virtual machine 112 with a virtual hardware operating platform. By interfacing with the virtual hardware operating platform, the virtual machines 112 access the computing resources of the host machine to execute the virtual machines' respective operations. As a result, a single host machine can support multiple virtual machines 112, each operating an operating system and/or other software entity, i.e., an application, collectively shown as 116 simultaneously through virtualization. Parameters configuring operation of the virtual machine 112 are defined via structure 114. In an aspect, the structure 114 may comprise at least one register.

To enable transfer of data packets into and from the virtualization system 100, via network resource 106, as well as routing the data packets among different entities of the virtualization system 100 via internal network, using interrupt driven kernel packet management may degrade network performance. Additionally, divorcing the packet routing and management functionality from the kernel's functionality enables the routing and management functionality to be developed and provided without dependence of a specific kernel's implementation.

Accordingly, there is a need in the art for a packet management, providing a solution to the above identified problems, as well as additional advantages.

SUMMARY

In an aspect of the disclosure, an apparatus with co-resident data-plane and network interface controllers implementing a method for network switching according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
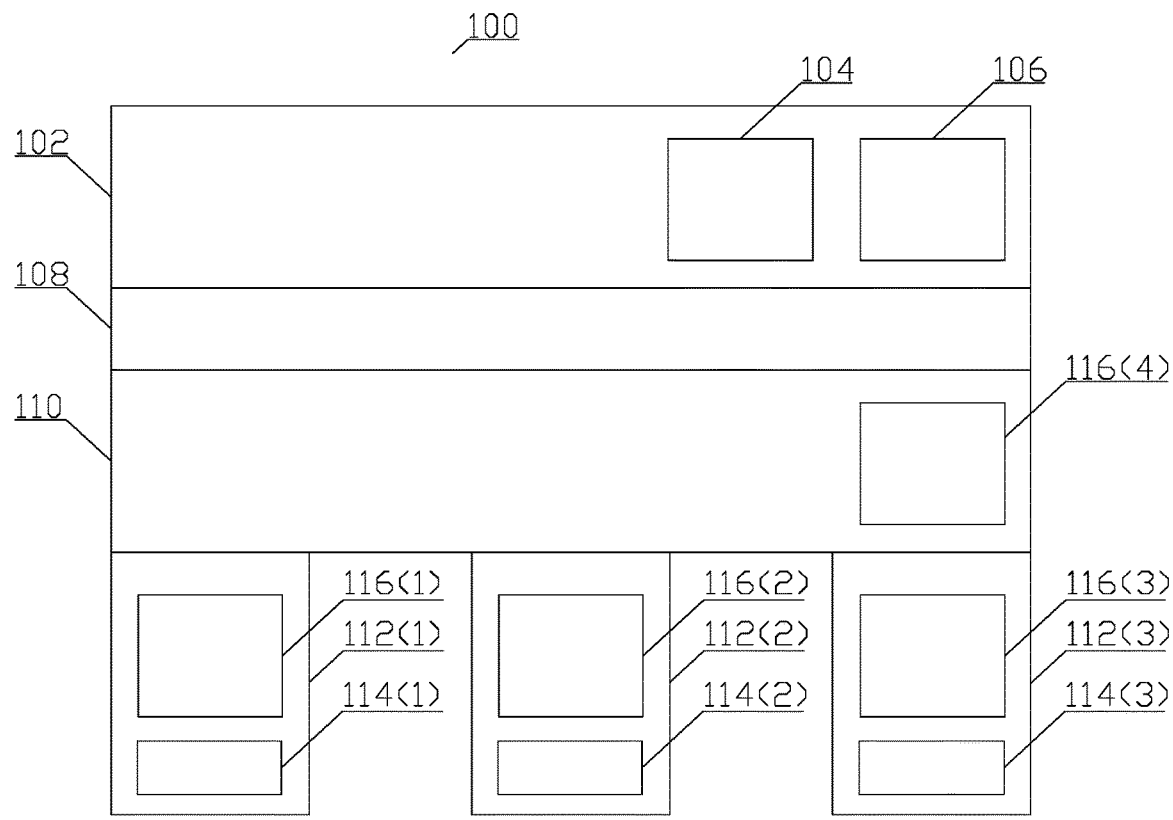
FIG. 1 depicts a conceptual structure of a virtualization system in accordance with known aspects.
Figure 2:
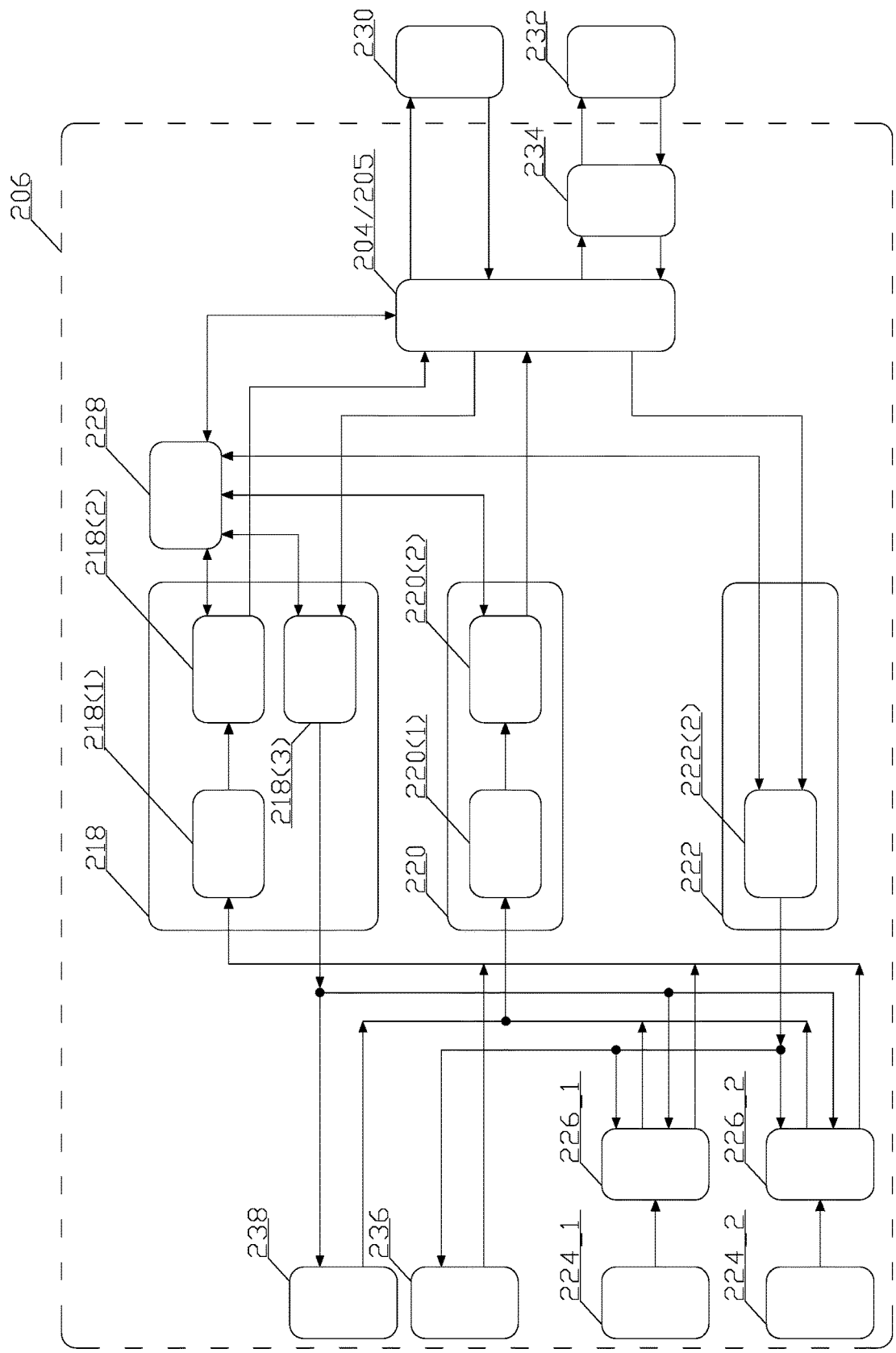
FIG. 2 depicts a conceptual structure of a network interface resources in accordance with an aspect of this disclosure.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. An expression "_X" in a reference indicates an instance of an element, while and expression "(X)" indicates a sub-block in a drawing where helpful for better understanding. Any unreferenced single and/or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 2 depicts a conceptual structure of a network interface resources 206 in accordance with an aspect of this disclosure. The structure 206 provides at least a NIC 218, a packet input processor (PKI) 220, and a packet output processor (PKO) 222 on a single chip, designed to minimize power consumption, chip area, input output, pin-out and other chip characteristics. Thus, the structure does not simply place two individual chips on a single piece of silicon material. A chip comprises a semiconductor material, onto which a set of electronic circuits is fabricated. A data packet from a communications network (not shown) arrives via one of physical connectors/ports 224 and is provided to communicatively coupled medium access controller (MAC) 226, hardware or a hardware and software entity that implements a media access control data communication protocol. In one aspect, the MAC 226 is also provided on the chip. The MAC 226 emulates a full-duplex logical communication channel in a multi-point network and provides the data packet to either the NIC 218 or the PKI 220. Although only two physical connectors/ports 224 and MACs 226 are shown, other number of ports and MACs are contemplated.

In one aspect, the MAC 226 selects the NIC 218 or the PKI 220 based on a value in a register (not shown), thus statically assigning the MAC 226 to either the NIC 218 or the PKI 220. In computer architecture, a processor register is a small amount of storage available as part of a CPU or other digital processor. Such registers are (typically) addressed by mechanisms other than main memory and can be accessed more quickly. Such a static assignment may be used to associate a connector/port, e.g., 224(1), with the NIC 218, e.g., because the connector/port 224(1) is already preceded with a router/switch using a network processor carrying efficiently packet management.

In another aspect, the MAC 226 selects the NIC 218 or the PKI 220 in accordance with a content of the data packet, e.g., a source address, a destination address, or any other content known to a person of ordinary skill in the art.

In yet another aspect, the MAC 226 selects the NIC 218 or the PKI 220 in accordance the combination of the aspects.

Consider first that the MAC 226 selects the NIC 218. The data packet is provided via a network facing inbound interface to a parser 218(1), which, parses the data packet in accordance with an implementation of any of the family of computer networking technologies, e.g., an Ethernet, an Internet Protocol (IP), the TCP, and other computer networking technologies known to a person of ordinary skill in the art, to determine the type of protocol used, and to apply some packet management, e.g., Quality of Service (QoS) to the data packets. The NIC 218 ascertains that the packet is valid by performing verification, e.g., a Cyclic Redundancy Check (CRC). The NIC 218 then requests a memory manager 228 to allocate a portion of a storage 204/205 to receive the data packet and additional information to another portion of the storage 204/205. The additional information may comprise a complete packet descriptor, or a list of commands which form a packet descriptor. The packet descriptor information may comprise, e.g., information at which addresses in the storage 204/205, the different parts of the data packet, e.g., a header, payload, are located, and other information known to a person of ordinary skills in the art. The allocated portion of a storage may comprise e.g., a buffer, i.e., a region of a physical storage used to temporarily store data while it is being moved from one place to another. The double reference 204/205 is meant to indicate that the storage may be distributed between chip comprising the network interface resources 206, identified by reference 205, and an off chip storage, identified by reference 204 residing on the system served by the network interface resources 206.

Once the storage 204/205 has been allocated, the NIC 218 writes the data packet and the additional information to the allocated portion of the storage 204/205. In one aspect, the NIC 218 may use e.g., Direct Memory Access (DMA) engine 218(2), which allows the storage 204/205 to be accessed independently of a central processing unit. In accordance with an implementation trading throughput against latency, the NIC 218 sends an interrupt to a kernel. Thus, in one aspect, when latency is critical, the NIC 218 may send the interrupt after processing each packet; in another aspect, the NIC 218 may accumulate several packets into the storage 204/205 before sending the interrupt.

The kernel executes an interrupt handler routine, packet processing related to packet management, e.g., switching/routing, packet/frame discrimination, Quality of service (QoS) enforcement, access control, encryption, Transmission Control Protocol (TCP) offload processing, routing, and other packet management known to a person skilled in the art, determines and delivers the data packet to the destination entity 230. The destination entity 230 may comprise a component of the kernel, the operating system, and any other entity of the system served by the network interface resources 206. At the destination entity 230 the delivered packet is placed to a queue (not shown) for processing. Methods for queue management, e.g., a tail drop, a back-pressure, a random early discard, a Quality of Service by the destination entity 230 are well known by a person of ordinary skill in the art. A queue is an organization of data into a structure in which entities, i.e., the data comprising a packet, are kept and are retrievable in a definite order.

When the entity 230 needs to send a data out over the communication network, in one aspect the entity 230 requests the memory manager 228 to allocate a portion of the storage 204/205 to receive a complete packet descriptor, or a list of commands which form a packet descriptor, and notifies the transmit DMA engine 218(3). In another aspect, the entity 230 requests the kernel to process the data for a transmission. In response, the kernel requests the memory manager 228 to allocate a portion of the storage 204/205 to receive a complete packet descriptor, or a list of commands which form a packet descriptor, and notifies the transmit DMA engine 218(3). In yet another aspect, the entity 230 requests the kernel to process the data for a transmission. In response, the kernel allocates a portion of the storage 204/205 to receive a complete packet descriptor, or a list of commands which form a packet descriptor, and notifies the transmit DMA engine 218(3). The DMA engine 218(3) reads the packet descriptors and provides the data packet via a network facing outgoing interface to the MAC 226. Alternatively, the DMA engine 218(3) executes the list of commands, assembles a packet from the data, and provides the data packet to the MAC 226. MAC 226 then transmits the data packet to the communication network via the physical connectors/ports 224(1).

Consider now that the MAC 226 selects the PKI 220. The data packet is provided a network facing interface to a parser 220(1), which parses the data packet in accordance with an implementation of any of the family of computer networking technologies, e.g., an Ethernet, Internet Protocol (IP), the TCP, and other computer networking technologies known to a person of ordinary skill in the art. In accordance with parameters obtained from fields of the parsed data packet, the PKI 220 determines a software or hardware entity, e.g., the entity 232 to receive and process the data packet. The parameters may comprise, e.g., a port at which the incoming packet was received, a destination MAC address, a destination IP address, and other fields known to a person skilled in the art. The entity 232 may comprise, e.g., an operating system, an application executed by the operating system, such application including a virtual machine, a hard disk, or any other entity known to a person of ordinary skill in the art.

The PKI 220 then requests the memory manager 228 to allocate a portion of a storage 204/205 to receive the data packet. Such a portion of a memory may comprise e.g., a buffer. Once the PKI 220 writes the data packet via an inside facing interface to the allocated portion of the storage 204/205, the PKI 220 provides an event notification to a packet handling software entity 234 that a data packet for the entity 232 is available. Such notification may comprise providing information to packet handling software entity 234 via a scheduler (not shown). Once the software entity 232 is ready to obtain work involving the data packet, the software entity 232 requests work from the scheduler. The term work is any operation to be carried out by the software entity 232. The scheduler retrieves the work, in form of the instructions to be processed and an address to the data packet(s) on which the work is to be carried out, and provides the work to the entity 232. The entity 232 then requests the data packet from the storage 204/205 and the data packet is processed by the packet handling software entity 234, which processes the packet in accordance with a packet management policy, and provides the packet to the entity 232, if the policy allows such delivery.

In one aspect, the packet handling software entity 234 may implement functionality related to packet management, e.g., layer 2 (L2) switching, layer 3 (L3) switching, traffic policing, access control, traffic shaping, deep packet inspection, and other packet management known to a person of ordinary skill in the art.

As appreciated by a person of ordinary skill in the art, L3 switching uses the MAC address from the host's network interface resource to decide where to forward frame. L3 uses a routable protocol address from the frame. Such routable protocol may comprise, e.g., IP, Internetwork Packet Exchange (IPX), AppleTalk, and other known to a person of ordinary skill in the art. In traditional systems, the switching functionality is implemented in a hardware, i.e., in an Application Specific Integrated Circuit (ASIC). Such an ASIC is not necessary in an aspect of the invention. Since the packet handling software entity 234 is implemented on an already existing hardware, i.e., a coprocessor, of the network interface resource 206, the functionality related to packet management may be implemented as additional software on the hardware. Thus, there may be no hardware cost in term of, e.g., additional chip area, power consumption, to this packet management function. A coprocessor is a computer processing unit used to supplement the functions of the central processing unit. Supplemental functions performed by the coprocessor may be floating point arithmetic, graphics, signal processing, string processing, encryption or I/O Interfacing with peripheral devices. The coprocessor carries out these functions under a close control of a supervisory processing unit.

When the entity 232 needs to send a data out over the communication network, the entity 232 requests the memory manager 228 to allocate a portion of the storage 204/205 to receive a complete packet descriptor, or a list of commands which form a packet descriptor, and notifies the PKO's 222 transmit DMA engine 222(2). The DMA engine 222(2) reads the packet descriptors via the PKO's 222 inside facing interface and provides the data packet to the MAC 226. Alternatively, the DMA engine 222(2) executes the list of commands, assembles a packet from the data, and provides the data packet via the PKO's 222 network facing interface to the MAC 226. MAC 226 then transmits the data packet to the communication network via the physical connectors/ports 224.

The conceptual structure 206 providing at least NIC and PKI/PKO on a single chip enables use of the chip in applications requiring use of both the NIC and PKI/PKO. By means of an example, consider a virtualized system 100 disclosed in FIG. 1. The operating system 108 may need to use the NIC portion of the network resource 106, while the virtual machine 112(1), which instantiates a data-plane may need to use the PKI/PKO portion of the network resource 106. Additionally, the chip allows providing packet management, including switching of a packet to the operating system 108, and/or other entities communication via a kernel, even if the packet arrives at the PKI/PKO portion of the network resource 106. Such a functionality may allow a packet intended for a plurality of destinations, e.g., a broadcast packet, a multicast packet, to reach all destinations. In addition, even if an entity, e.g., a virtual machine 112(2), is capable of instantiating a data-plane, the entity may still prefer to receive packets via the NIC portion of the network resource 106, because due to the difference in interrupt driven software, i.e., operating system, and event driven software, i.e., data-plane, the application execution on the virtual machine 112(2) may better use the kernel's capabilities. Thus, the packet may be directed to the PKI/PKO portion of the network resource 106, use some of the efficient packet management functionality of the network processor, and then be routed via the NIC portion of the network resource 106 to use the kernel's capabilities.

Referring back to the conceptual structure 206, to enable communication between the NIC 218 and the PKI 220 respective PKO 222, hardware loopback entities 236, 238 are provided.

Figure 3A:
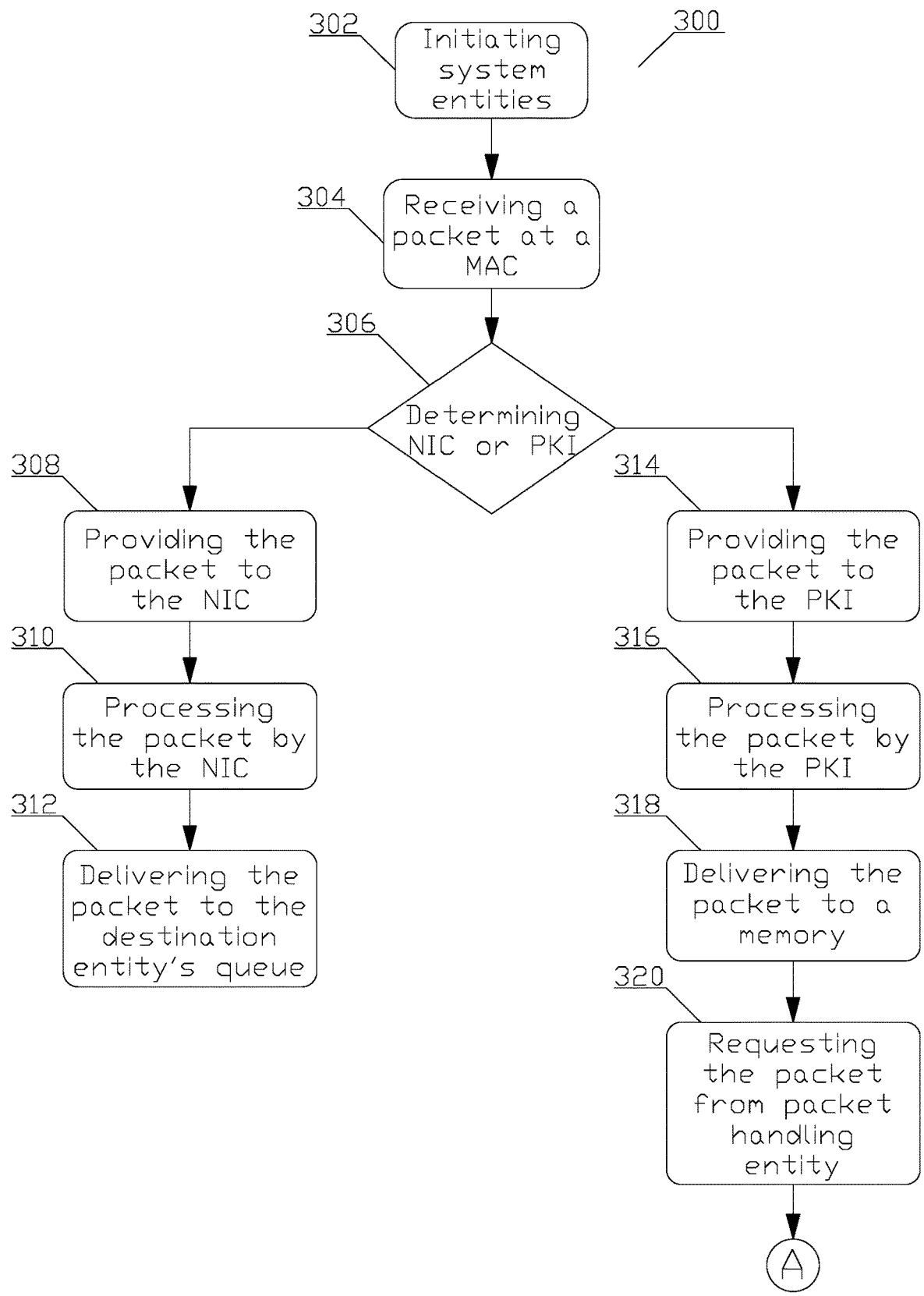
FIG. 3a depicts a first part of a flow chart enabling the process for switching between a NIC and a Packet input processor (PKI)/Packet output processor (PKO) for incoming packet in accordance with an aspect of this disclosure.
Figure 3B:
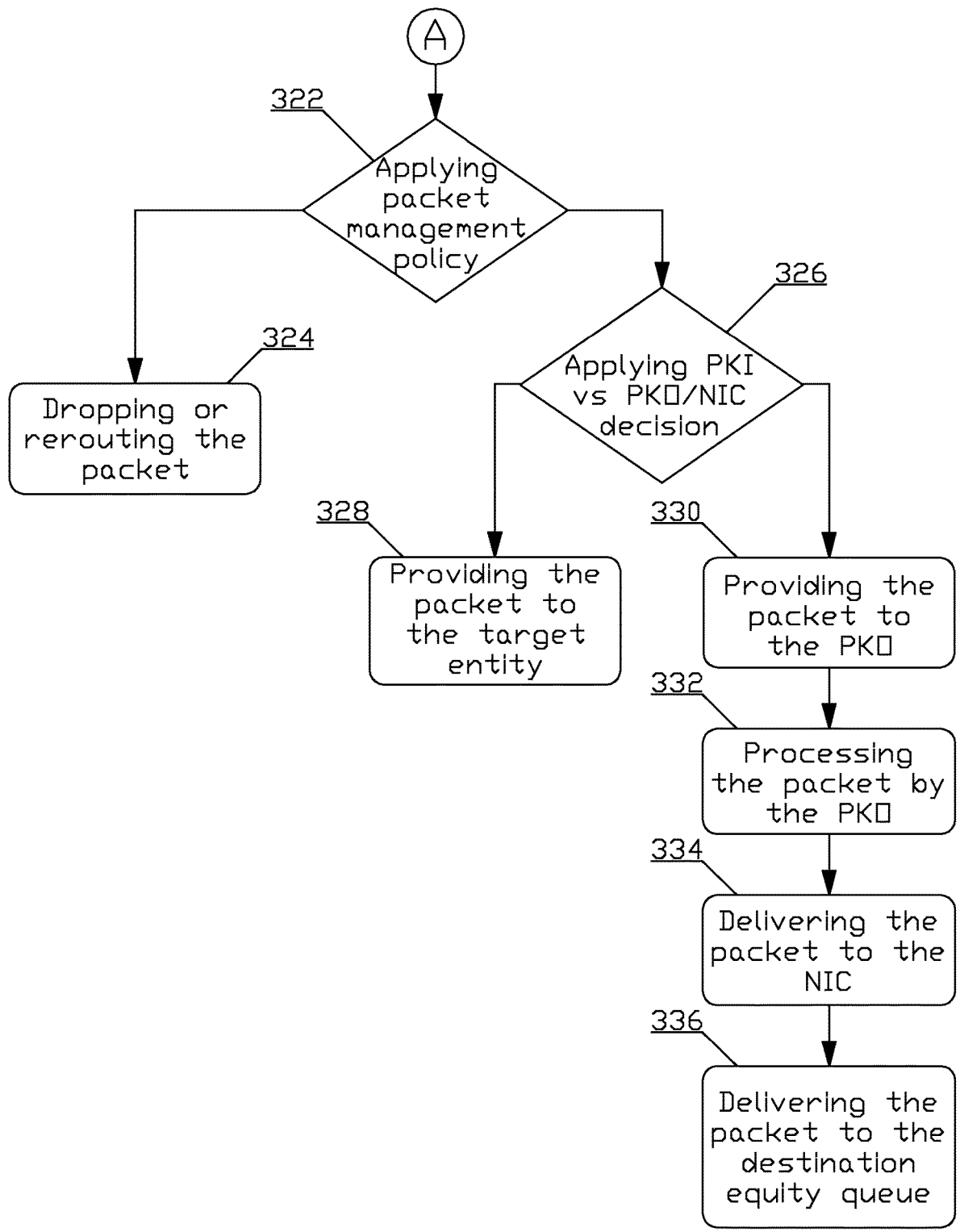
FIG. 3b depicts a second part of the flow chart enabling the process for switching between a NIC and a Packet input processor (PKI)/Packet output processor (PKO) for incoming packet in accordance with an aspect of this disclosure.

FIG. 3 depicts a flow chart enabling the process for switching between the NIC and PKI/PKO for incoming packet. To further clarify the relationship between the flow chart of FIG. 3 and certain elements of the conceptual structure of a virtualization system 100 disclosed in greater details in FIG. 1 and associated text, and the network resource 206 as disclosed in FIG. 2 and associated text, references to the structural elements are in parenthesis.

In step 302, a hypervisor (110) initiates entities that configure a specific operation of the virtual system (100), e.g., the hypervisor (110), the virtual machine(s) (112), i.e., structures (114), and the network resources, (106), i.e., register (114). The process continues in step 304.

In step 304, a data packet from a communications network arrives via one of physical connectors/ports (224_n) and is provided to a MAC (226). The process continues in step 306.

In step 306, the MAC (226) determines whether the packet should be provided to a NIC (218) or to the PKI (220). The determination is carried out in accordance with a specific implementation.

Thus, in one aspect, the MAC (226) selects the NIC (218) or the PKI (220) in accordance with a content of the data packet, e.g., a source address, a destination address, or any other content known to a person of ordinary skill in the art.

In another aspect, the MAC (226) determines a value of the variable in the register (114). When the variable has a first value, the MAC (226) selects the NIC (218); when the variable has a second value, the MAC (226) selects the PKI (220).

In yet another aspect, the variable in the register (114) is a multi-state variable. When the variable has a first value, the MAC (226) selects the NIC (218); when the variable has a second value, the MAC (226) selects the PKI (220); and when the variable has a third value, the decision is carried out in accordance with the content of the data packet.

A person skilled in the art will appreciate that other implementations of the decision process are within the scope of the invention.

The process continues in step 308 when the MAC (226) determined that the packet is to be delivered to the NIC (218), and the process continues in step 314 when the MAC (226) determined that the packet is to be delivered to the PKI (220).

In step 308, the packet is delivered to the NIC (218). The process continues in step 310.

In step 310, the NIC (218) processes the packet as disclosed infra and sends an interrupt to a kernel. The process continues in step 312.

In step 312, the kernel processes the packet as disclosed infra, and delivers the data packet, to a queue of the destination entity (230) for processing as disclosed infra.

In step 314, the packet is delivered to the PKI (220). The process continues in step 316.

In step 316, the PKI (220) processes the packet to determine a target software or hardware entity 232 to receive and process the data packet as disclosed infra. The process continues in step 318.

In step 318, the data packet is written to the allocated portion of the memory (204/205), and packet handling software entity (234) is notified that a data packet for the entity (232) is available as disclosed infra. The process continues in step 320.

In step 320, the target software or hardware entity (232) that has obtained work involving the data packet requests the data packet(s) from the packet handling software entity (234) as disclosed infra. The process continues in step 322.

In step 322, the packet handling software entity (234) processes the packet in accordance with a packet management policy. The packet management policy for the packet is determined in accordance with criteria that may be based on the fields in the packet, the rate of a traffic, and other criteria known to a person of ordinary sill in the art. By means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in step 324 when the packet handling software entity (234) determines that the packet need to be discarded or be re-routed to a different destination; otherwise, the process continues in step 326.

In step 324, the packet is dropped or re-routed to another entity, e.g., an intrusion detection entity.

In step 326, if the PKI (220) determined that target entity to receive the packet is an entity, which instantiated a data-plane and the processing continues in step 328. Otherwise the packet is provided to the PKO (222), and the processing continues in step 330.

In step 328, the packet is delivered to the target entity.

In step 330, the packet is processed by the PKO (222) as disclosed infra. The process continues in step 332.

In step 332, the PKO (222) provides the packet to the NIC (218) via a loopback entity (236) the since the destination entity (232) to receive and process the data packet is incapable of, or does not instantiate a data-plane. The processing continues in step 334.

In step 334, the NIC (218) processes the data packet as disclosed infra and sends an interrupt to a kernel. The process continues in step 336.

Figure 4A:
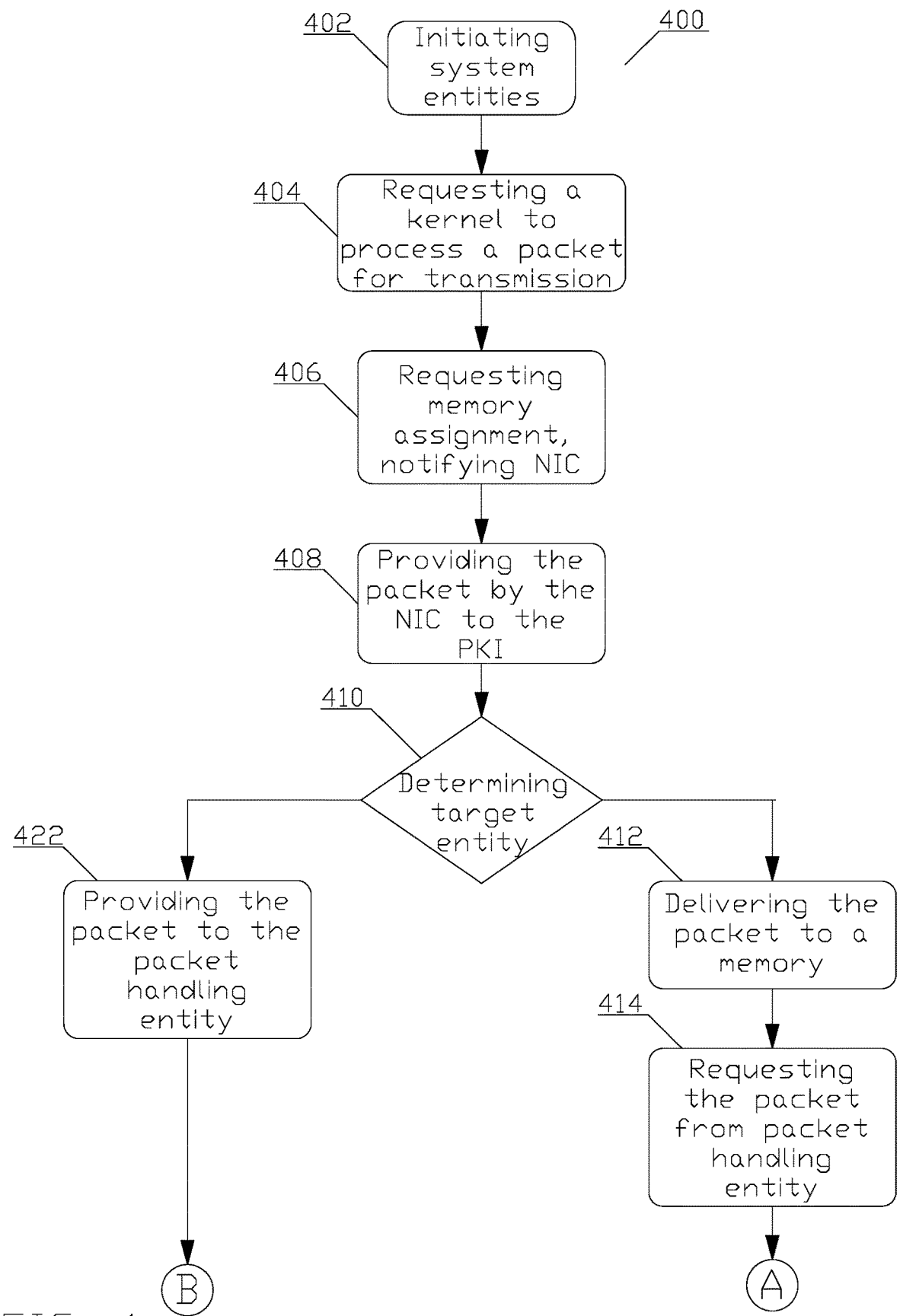
FIG. 4a depicts a first part of a flow chart enabling the process for switching between the NIC and the PKI/PKO for outgoing packet in accordance with an aspect of this disclosure.
Figure 4B:
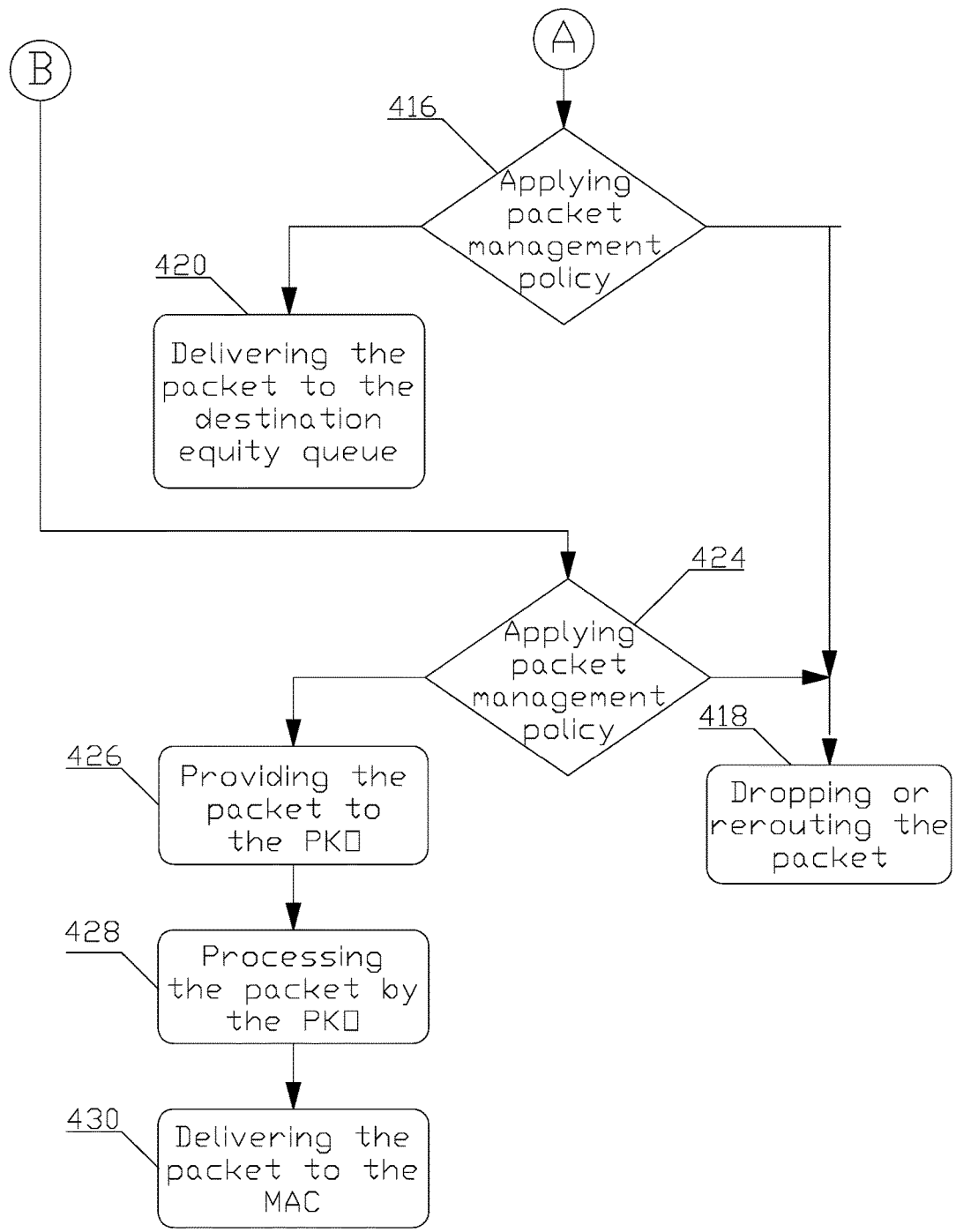
FIG. 4b depicts a second part of the flow chart enabling the process for switching between the NIC and the PKI/PKO for outgoing packet in accordance with an aspect of this disclosure.

In step 336, the kernel processes the packet as disclosed infra, and delivers the data packet, to a queue of the target entity (232) for processing as disclosed supra. The process ends FIG. 4 depicts a flow chart enabling the process for switching between the NIC and PKI/PKO for outgoing packet. To further clarify the relationship between the flow chart of FIG. 4 and certain elements of the conceptual structure of a virtualization system 100 disclosed in greater details in FIG. 1 and associated text, and the network resource 206 as disclosed in FIG. 2 and associated text, references to the structural elements are in parenthesis.

In block 402, a hypervisor (110) initiates entities that configure a specific operation of the virtual system (100), e.g., the hypervisor (110), the virtual machine(s) (112), i.e., structures (114), and the network resources, (106), i.e., register (114). The process continues in block 404.

In block 404, an entity in of the virtual system (100), e.g., an entity (230) running as a guest on virtual machine (112(1)), needs to send a data out over the communication network. In one aspect, the requests the memory manager (228) to allocate a portion of the storage (204/205) to receive a complete packet descriptor, or a list of commands which form a packet descriptor, and notifies the NIC (218), e.g., the transmit DMA engine (218(3)). The process continues in block 408. In another aspect, the entity (230) requests the kernel to process the data for a transmission. The process continues in block 406.

In block 406, the kernel requests the memory manager (228) to allocate a portion of the storage (204/205) to receive a complete packet descriptor, or a list of commands which form a packet descriptor, and notifies the NIC (218), e.g., the transmit DMA engine (218(3)). The process continues in block 408.

In block 408, the DMA engine 218(3) reads the packet descriptors or, alternatively, executes the list of commands and assembles a packet from the data, and provides the data packet via the loopback entity (238) to the PKI (220). The process continues in block 410.

In block 410, the PKI (220) processes the packet to determine a target software or hardware entity to receive and processes the data packet as disclosed infra. When the PKI (220) determines that the target software or hardware entity is within the virtual system (100), e.g., an entity (232) running as a guest on virtual machine (112(2)), the process continues in block 412; otherwise the process continues in block 422.

In block 412, the data packet is written to the allocated portion of the memory (204/205), and packet handling software entity (234) is notified that a data packet for the entity (232) is available as disclosed infra. The process continues in step 414.

In step 414, the target software or hardware entity (232) that has obtained work involving the data packet requests the data packet(s) from the packet handling software entity (234) as disclosed infra. The process continues in step 416.

In step 416, the packet handling software entity (234) processes the packet in accordance with a packet management policy. The packet management policy for the packet is determined in accordance with different criteria. Such criteria may be based on the fields in the packet, the rate of a traffic, and other criteria known to a person of ordinary sill in the art. by means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in step 418 when the packet handling software entity (234) determines that the packet need to be discarded or be re-routed to a different destination; otherwise, the process continues in step 420.

In step 418, the packet is dropped or re-routed to another entity, e.g., an intrusion detection entity.

In step 420, the packet is delivered to the queues of the target entity (232).

In step 422, the packet is delivered to the packet handling software entity (234). The process continues in block 424.

In step 424, the packet handling software entity (234) processes the packet in accordance with a packet management policy. The packet management policy for the packet is determined in accordance with criteria that may be based on the fields in the packet, the rate of a traffic, and other criteria known to a person of ordinary sill in the art. by means of an example, the fields in the packet, e.g., the source or the destination MAC or IP address may be used for access control; the data portion, and possibly the header of the packet may be used for deep packet inspection for protocol non-compliance, viruses, spam, intrusions, or defined criteria to decide whether the packet may be passed, be discarded, or be re-routed to a different destination. By means of another example, the rate of the traffic may be used for traffic policing, and/or traffic shaping. The process continues in step 418 when the packet handling software entity (234) determines that the packet need to be discarded or be re-routed to a different destination; otherwise, the process continues in step 426.

In step 426, the packet is delivered to the PKO (222). The process continues in step 428.

In step 428, the packet is processed by the PKO (222) as disclosed infra. The process continues in step 430.

In step 430, the PKO (222) provides the packet to the output port (224) via the MAC (226), since the destination entity to receive and process the data packet is outside the virtual system (100). The process ends.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for network switching with co-resident data-plane processors and a network interface controller, comprising:
   receiving a packet from a network at a medium access controller;
   determining by the medium access controller whether the packet should be provided to a data-plane packet input processor or to the network interface controller of a network interface resource comprising: the data-plane packet input processor, a data-plane packet output processor, and the network interface controller, implemented on a chip;
providing the packet to the data-plane packet input processor according to the determining;
determining by the data-plane packet input processor that a target entity of the packet is not capable of instantiating or does not instantiate a data-plane; and
in accordance with the determination that the target entity is not capable of instantiating or does not instantiate a data-plane, providing the packet to the target entity via the data-plane packet output processor, a loopback entity and the network interface controller.

2. The method as claimed in claim 1, wherein:
the determining by the medium access controller whether the packet should be provided to the data-plane packet input processor or to the network interface controller of the network interface resource comprises determining a content of the packet by the medium access controller; and
providing the packet to the data-plane packet input processor according to the determining comprises providing the packet to the data-plane packet input processor in accordance with the determined content of the packet.

3. The method as claimed in claim 2, wherein the content of the packet is a source address or a destination address; and
providing the packet to the data-plane packet input processor is in accordance with the source address or the destination address.

4. The method as claimed in claim 1, wherein:
the determining by the medium access controller whether the packet should be provided to the data-plane packet input processor or to the network interface controller of a network interface resource comprises determining a state of a register; and
providing the packet to the data-plane packet input processor according to the determining comprises providing the packet to the data-plane packet input processor in accordance with the state of the register.

5. The method as claimed in claim 4, wherein the state of the register represents a static assignment that associates an input port of the medium access controller with the data-plane packet input processor or the network interface controller; and
providing the packet to the data-plane packet input processor is in accordance with the static assignment.

6. The method as claimed in claim 1, wherein:
the determining by the medium access controller whether the packet should be provided to the data-plane packet input processor or to the network interface controller of a network interface resource comprises determining a state of a register and determining a content of the packet; and
providing the packet to the data-plane packet input processor according to the determining comprises providing the packet to the data-plane packet input processor in accordance with the state of the register and the content of the packet.

7. The method as claimed in claim 1, further comprising:
processing the packet by the data-plane packet input processor to determine a target entity;
providing the packet processed by the data-plane packet input processor to a storage;
requesting the packet from the storage by the target entity; and
processing the packet by a packet handling entity in accordance with a packet management policy.

8. The method as claimed in claim 7, wherein the processing the packet by the packet handling entity in accordance with the packet management policy comprises:
discarding the packet.

9. The method as claimed in claim 7, wherein the processing the packet by the packet handling entity in accordance with the packet management policy comprises:
providing the packet to a different destination entity than the target entity.

10. The method as claimed in claim 7, wherein the processing the packet by the packet handling entity in accordance with the packet management policy comprises:
providing the packet to the target entity via the data-plane packet input processor.

11. The method as claimed in claim 7, wherein the processing the packet by the packet handling entity in accordance with the packet management policy comprises:
providing the packet to the target entity via the data-plane packet output processor, a loopback entity, and the network interface controller.

12. The method as claimed in claim 7, wherein the processing the packet by the packet handling entity in accordance with the packet management policy comprises:
switching the packet route on layer 2 and layer 3.

13. The method as claimed in claim 1, wherein:
the medium access controller is not included in the network interface controller; and
the medium access controller determines whether the packet should be provided to the data-plane packet input processor or to the network interface controller prior to the packet being received by the data-plane packet input processor or by the network interface controller.

14. A network interface resource comprising:
a data-plane packet input processor;
a network interface controller; and
a medium access controller configured to:
receive a packet from a network;
determine, based on a content of the packet or a state of a register, whether the packet should be provided to the data-plane packet input processor or to the network interface controller;
provide the packet to the data-plane packet input processor according to the determining;
wherein the data-plane packet input processor is configured to:
determine that a target entity of the packet is not capable of instantiating or does not instantiate a data-plane; and
in accordance with the determination that the target entity is not capable of instantiating or does not instantiate a data-plane, provide the packet to the target entity via the data-plane packet output processor, a loopback entity and the network interface controller.

15. The network interface resource as claimed in claim 14, wherein:
the medium access controller is not included in the network interface controller; and
the medium access controller is configured to determine whether the packet should be provided to the data-plane packet input processor or to the network interface controller prior to the packet being received by the data-plane packet input processor or by the network interface controller.

16. The network interface resource as claimed in claim 14, wherein the content of the packet is a source address or a destination address; and the medium access controller is configured to provide the packet to the data-plane packet input processor in accordance with the source address or the destination address.

17. The network interface resource as claimed in claim 14, wherein the state of the register represents a static assignment that associates an input port of the medium access controller with the data-plane packet input processor or the network interface controller; and the medium access controller is configured to provide the packet to the data-plane packet input processor in accordance with the static assignment.

* * * * *

UNITED STATES PATENT AND TRADEMARK OFFICE
CERTIFICATE OF CORRECTION

PATENT NO. : 11,509,750 B2
APPLICATION NO. : 16/132424
DATED : November 22, 2022
INVENTOR(S) : Snyder, II et al.

It is certified that error appears in the above-identified patent and that said Letters Patent is hereby corrected as shown below:

In the Specification

In Column 1, Line 43, delete "a the" and insert --a--

In Column 1, Line 48, delete "A the" and insert --A--

In Column 4, Line 54, delete "and" and insert --an--

In Column 6, Line 6, delete "accordance" and insert --accordance with--

In Column 10, Line 13, delete "sill" and insert --skill--

In Column 10, Line 38, delete "the since" and insert --since--

In Column 10, Line 48, delete "ends" and insert --ends.--

In Column 10, Line 62, delete "in of" and insert --in--

In Column 11, Line 39, delete "sill" and insert --skill--

In Column 11, Line 64, delete "sill" and insert --skill--

In the Claims

In Column 14, Line 4, in Claim 8, delete "the packet by" and insert --of the packet by--

In Column 14, Line 8, in Claim 9, delete "the packet by" and insert --of the packet by--

In Column 14, Line 13, in Claim 10, delete "the packet by" and insert --of the packet by--

Signed and Sealed this
Thirtieth Day of April, 2024

Katherine Kelly Vidal
*Director of the United States Patent and Trademark Office*

In Column 14, Line 18, in Claim 11, delete "the packet by" and insert --of the packet by--

In Column 14, Line 24, in Claim 12, delete "the packet by" and insert --of the packet by--